(12) United States Patent
Ogata et al.

(10) Patent No.: US 6,465,983 B1
(45) Date of Patent: Oct. 15, 2002

(54) OVERCURRENT PROTECTION DEVICE

(75) Inventors: Hiroaki Ogata; Masaya Suenari; Mikio Saito, all of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 08/702,681

(22) PCT Filed: Dec. 18, 1995

(86) PCT No.: PCT/JP95/02593

§ 371 (c)(1),
(2), (4) Date: Jun. 25, 2001

(87) PCT Pub. No.: WO96/19859

PCT Pub. Date: Jun. 27, 1996

(30) Foreign Application Priority Data

Dec. 19, 1994 (JP) .............................. 6-315099

(51) Int. Cl.[7] ................................................ H02P 5/28
(52) U.S. Cl. .................... 318/811; 318/599; 318/139; 318/799; 318/825
(58) Field of Search ................. 318/139, 599, 318/811, 798, 825

(56) References Cited

U.S. PATENT DOCUMENTS 4,456,097 A * 6/1984 Salihi ..................... 187/29 R
5,341,286 A * 8/1994 Inoue et al. ................. 363/98
5,465,011 A   11/1995 Miller et al. ................. 307/64
5,483,141 A * 1/1996 Uesugi ....................... 318/811
5,708,343 A * 1/1998 Hara et al. .................. 318/599

FOREIGN PATENT DOCUMENTS

DE  3611484   10/1987
DE  4128962    3/1993

* cited by examiner

*Primary Examiner*—Robert E. Nappi
*Assistant Examiner*—Rina I. Duda
(74) *Attorney, Agent, or Firm*—Ernest A. Beutler

(57) ABSTRACT

At Step Sb3, a duty factor, which was calculated at Step Sb2 on the basis of a data for a feed-back control, is compared with a limit value of the duty factor. If the duty factor is less than the limit value, a pulse for the PWM control is modulated to have the calculated duty factor at Step Sb4. If the duty factor is greater than the limit value, the pulse for the PWM control is modulated to have the duty factor of the limit value at Step Sb5. Accordingly, the duty factor provided for a current value instruction is not in excess of the limit value, so that the secondary battery is prevented from discharging overcurrent in excess of the limit current which can be discharged from the secondary battery. Accordingly, although the capacitance of the secondary battery is not large, the lifetime of the secondary battery is prevented from being shortened.

10 Claims, 4 Drawing Sheets

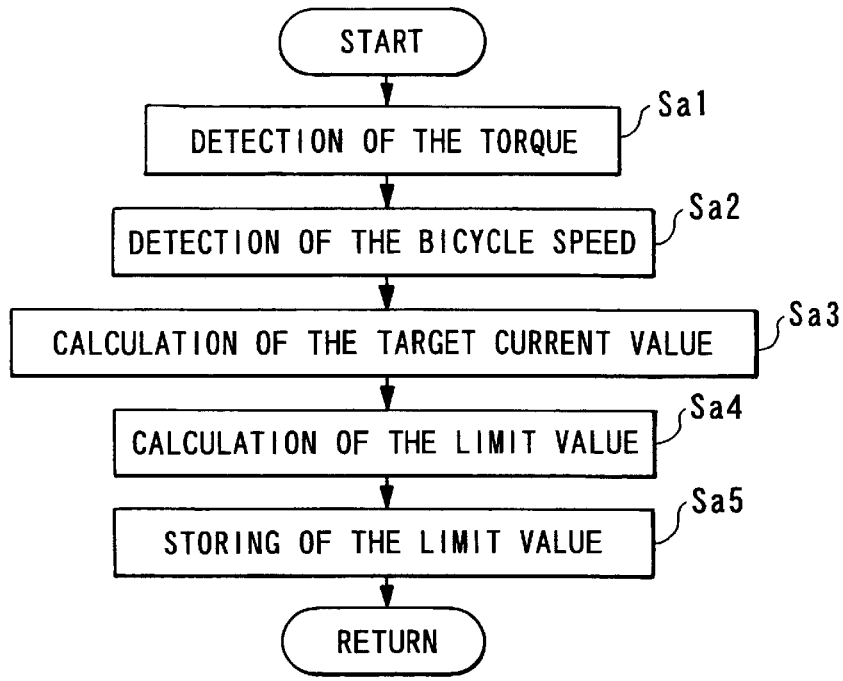
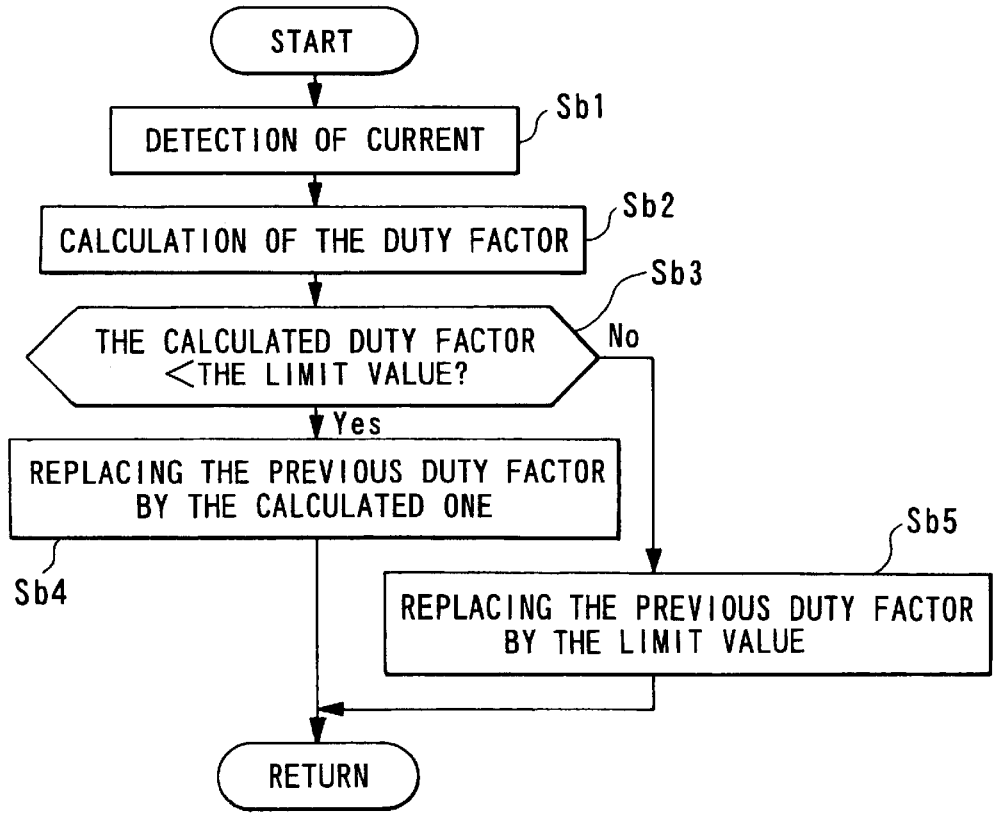

OVERCURRENT PROTECTION DEVICE

TECHNICAL FIELD

The present invention relates to an overcurrent protection device for preventing rechargeable secondary cells, for example, enclosed lead acid cells or enclosed Ni—Cd cells, from discharging overcurrent.

BACKGROUND ART

As well known, rechargeable secondary cells, for example, enclosed lead acid cells or enclosed Ni—Cd cells have been used widely for power sources of various devices, machines, and the like. Usually, if a large current (overcurrent) is discharged at a moment from such a sort of secondary cell, the cell heats up to deteriorate, whereby the lifetime thereof is shortened. Consequently, dischargeable current value is limited in accordance with the capacitance of an individual cell. These kinds of secondary cells have been used for electric vehicles, e.g., electric conveying carts, electric automobiles, or human-driving vehicles with auxiliary power sources. Since necessary power for the electric automobiles varies every moment, it is necessary to prepare secondary cells, of which the capacitance is much larger than a needed maximum current value in order to prevent the cells from discharging overcurrent.

However, these secondary cells, of which the capacitance is large too much, cause other problems: sizes of devices or machines are inevitable to be large and productions of the devices or machines are costly.

DISCLOSURE OF THE INVENTION

Accordingly, it is an object of the present invention to provide an overcurrent protection device for preventing secondary cells from discharging overcurrent, whereby the lifetime thereof is not substantially shortened although the capacitance of the cells is not large.

To resolve the above-described problems, in accordance with the invention stated in claim 1, an overcurrent protection device is capable of being connected to a current controlling device, the current controlling device including a switching means for allowing a current, corresponding to a duty factor of a pulse for a PWM control provided therefor, flows from at least one secondary cell to a motor; current detecting means for detecting the current flowing to the motor and for outputting this detection result; duty factor calculating means for calculating the duty factor, corresponding to a current value instruction, in order to adjust the current flowing to the motor, so that the detection result of the current detecting means is coincident with a target current value which should flow to the motor; and a pulse generating means for generating a pulse for the PWM control having the duty factor calculated by the duty factor calculating means and for providing the pulse for the switching means. The overcurrent protection device being characterized in that it comprises: limit calculating means for dividing a limit current value, which can be discharged from the secondary cell, by the target current value and for outputting the division result as a limit value of the duty factor; and selection means for comparing the duty factor calculated by the duty factor calculating means with the limit value, the selection means providing the duty factor calculated by the duty factor calculating means for the pulse generating means if the duty factor is less than the limit value, the selection means providing the limit value for the pulse generating means if the duty factor is greater than the limit value.

In accordance with the invention stated in claim 2, an overcurrent protection device is capable of being connected to a current controlling device, the current controlling device including a switching means for allowing a current, corresponding to a duty factor of a pulse for a PWM control provided therefor, flows from at least one secondary cell to a motor; current detecting means for detecting the current flowing to the motor and for outputting this detection result; duty factor calculating means for calculating the duty factor, corresponding to a current value instruction, in order to adjust the current flowing to the motor, so that the detection result of the current detecting means is coincident with a target current value which should flow to the motor; and a pulse generating means for generating a pulse for the PWM control having the duty factor calculated by the duty factor calculating means and for providing the pulse for the switching means. The overcurrent protection device is characterized in that it comprises: limit calculating means for dividing a limit current value, which can be discharged from the secondary cell, by the detection result of the current detecting means and for outputting the division result as a limit value of the duty factor; and selection means for comparing the duty factor calculated by the duty factor calculating means with the limit value, the selection means providing the duty factor calculated by the duty factor calculating means for the pulse generating means if the duty factor is less than the limit value, the selection means providing the limit value for the pulse generating means if the duty factor is greater than the limit value.

In accordance with the invention stated in claim 3, the duty factor calculating means calculates the duty factor at first intervals, and the limit calculating means calculates the limit value at second intervals, the second intervals being prescribed longer than the first intervals.

OPERATIONS

According to the present invention, the limit calculating means divides the limit current value, which can be discharged from the secondary cell, by the target current value which should be supplied to the motor or by the detection result of the current detecting means. Then, the limit calculating means outputs the division result as a limit value of the duty factor. The selection means compares the duty factor calculated by the duty factor calculating means with the limit value calculated by the limit calculating means. The selection means provides the duty factor, which was calculated by the duty factor calculating means, for the pulse generating means if the duty factor is less than the limit value. On the other hand, if the duty factor is greater than the limit value, the selection means provides the limit value for the pulse generating means. Accordingly, the duty factor of the generated pulse for the PWN control is not in excess of the limit value, so that it is prevented that the overcurrent in excess of the limit of the battery current is discharged from the secondary cells.

BRIEF DESCRIPTION OF THE DRAWINGS

FIG. 2 is a flow chart representing an operation of the embodiment;

FIG. 3 is a flow chart representing another operation of the embodiment;

BEST MODE FOR CARRYING OUT THE INVENTION

With reference to the accompanying drawings, embodiments of the invention will be described hereinafter.

Figure 1:
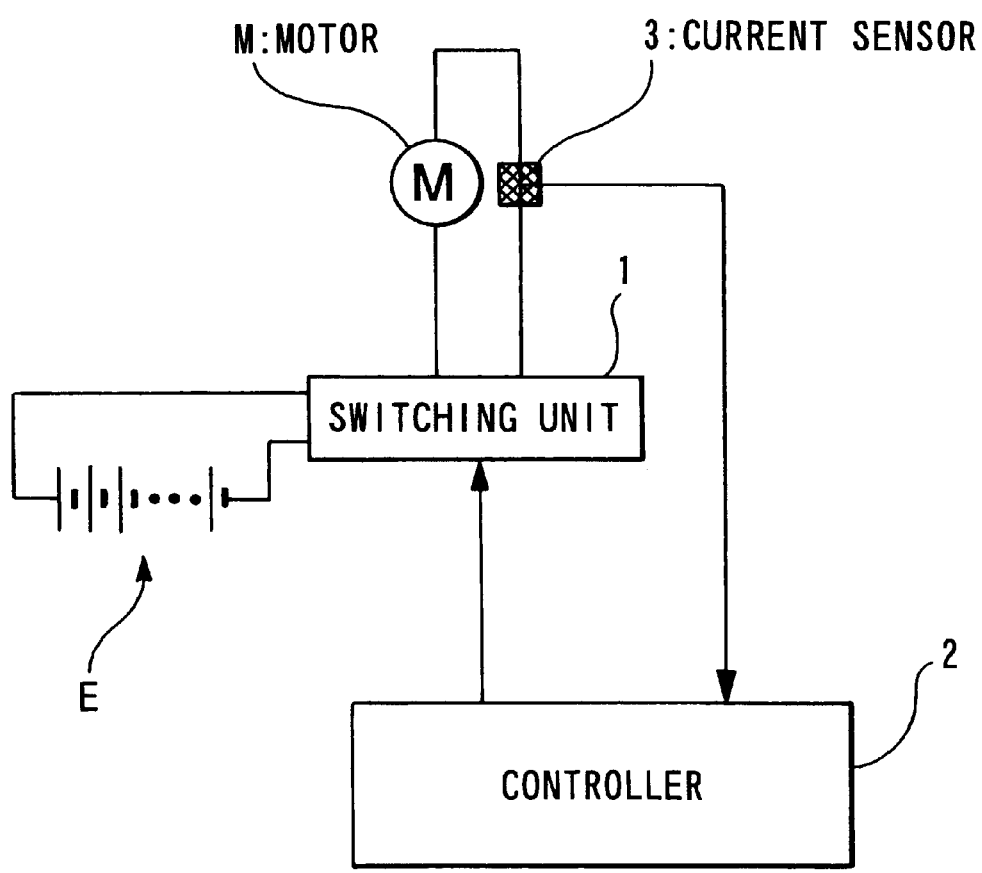
FIG. 1 is a block diagram showing an entire structure of a current controlling device according to an embodiment of the invention.

FIG. 1 is a block diagram showing an entire structure of a current controlling device according to an embodiment of the invention. The current controlling device is applied to a bicycle having an auxiliary power source (not shown). In the bicycle with the auxiliary power source, an electric current is supplied from a secondary battery constituted of, e.g., enclosed lead acid cells or enclosed Ni-Cd cells, the current value being proportional to the treading force on the pedals of the bicycle given by the rider's feet. As a result, the bicycle is driven by the combination of the motor power and the human power.

In FIG. 1, reference sign "E" depicts a rechargeable battery (secondary battery). The secondary battery E is constituted of a plurality of cells, for example, enclosed lead acid cells or enclosed Ni-Cd cells, which are connected in series. Reference numeral 1 depicts a switching unit and 2 depicts a controller. The controller 2, which will be described later, supplies a pulse for a PWM (pulse width modulation) control. The switching unit 1 allows a current from the secondary battery E to flow to the motor M in a manner that the current value is in accordance with the duty factor of the pulse, which corresponds to a current value instruction, from the controller 2. Reference numeral 3 denotes a current sensor which detects the actual current value flowing to the motor M, and which provides a detection output signal for the controller 2.

The controller 2 is constituted of a CPU (center processing unit), a memory, an A/D (analogue/digital) converter, a D/A (digital/analogue) converter, and so on. These components are not represented in FIG. 1. The controller 2 generates the pulse for the PWM control, which corresponds to a current value instruction. Also, the controller 2 adjusts the width of the pulse based on a difference between a target current value for the motor M and the detected current value fed back from the current sensor 3. In other words, the controller 2 conducts a feed-back control. The target current value is calculated by the controller 2 itself on the basis of measurement results by a torque meter (not shown) and a speed meter (not shown). The torque meter measures the above-mentioned treading force on the pedals by the rider's feet, and the speed meter measures the actual speed of the bicycle. In addition to the above feed-back control, the controller 2 conducts an overcurrent protection control which will be described later.

Next, with reference to FIGS. 2 and 3, the operations of the embodiment will be described. FIG. 2 is a flow chart showing a routine for calculating the above-mentioned target current value. The controller 2 repeats this routine every 5 milliseconds.

FIG. 3 is a flow chart showing a routine for controlling the current. The controller 2 repeats this routine every 64 microseconds. Since the controller 2 repeats these routines, respectively, at the intervals, the controller 2 carries out a feed-back control of the current value and the control for the overcurrent protection.

First, with reference to FIG. 2, the routine for calculating the target current value will be described. As shown in FIG. 2, in the controller 2, the output analogue signals from the torque meter and the speed meter are converted to digital signals, and then the digital signals are provided for the CPU (Steps Sa1 and Sa2). The CPU calculates the target current value, which should be supplied to the motor M, on the basis of the measured torque value and the measured speed value, and the calculated target current value is stored in the memory at Step Sa3.

Next, the CPU of the controller 2 calculates a limit value which is an upper limit of the duty factor of the pulse for the PWM control on the switching unit 1 at Step Sa4. That is, since the battery current (current flowing from the secondary battery E during one pulsation of the pulse for the PWM control) is a product of the target current value and the duty factor of the pulse for the PWM control, the limit value of the duty factor is equal to the limit of the battery current divided by the target current value. The limit of the battery current was previously determined by the capacitance of the secondary battery E and was stored previously in the memory. After the calculation, the obtained limit value of the duty factor is stored in the memory at Step Sa5.

In the same manner, the routine for calculating the target current value shown in FIG. 2 is repeated every 5 milliseconds, so that the target current value and the limit of the duty factor are repeatedly renewed.

Next, referring to FIG. 3, the routine for controlling the current will be described. As shown in FIG. 3, in the controller 2, the output analogue signal from the current sensor 3 is converted to a digital signal, and then the digital signal is provided for the CPU at Step Sb1. On the basis of the difference between the actual current value detected by the current sensor 3 and the target current value stored in the memory at Step Sa3, the CPU adjusts the current value for the motor M, i.e., conducts the feed-back control. More specifically, the CPU newly calculates the duty factor of the pulse for the PWM control, which corresponds to the current value instruction (Step Sb4).

The CPU of the controller 2, then, at Step Sb3, compares the duty factor calculated at Step Sb2 with the limit value of the duty factor stored in the memory at Step Sa5. Here, if the duty factor calculated at Step Sb2 is less than the limit value, the CPU, at Step Sb4, replaces the previous duty factor of the pulse for the PWM control on the switching unit 1 by the calculated duty factor.

On the other hand, at Step Sb3, if the duty factor calculated at Step Sb2 is greater than the limit value, the CPU, at Step Sb5, replaces the previous duty factor of the pulse for the PWM control on the switching unit 1 by the limit value of the duty factor.

In the same manner, the routine for the control of the current shown in FIG. 3 is repeated every 64 microseconds, the current supplied to the motor M is repeated to be controlled in the feed-back control manner, and the current discharged from the secondary battery E can be limited, so that the overcurrent is protected.

In summary, according to the embodiment described hereinbefore, the secondary battery E is prevented from discharging a current, which is in excess of the limit to the battery current, whereby the secondary battery E is also prevented from heating up and from deterioration. Consequently, the lifetime of the secondary battery E is not substantially shortened.

Additionally, in the present embodiment, the limit value of the duty factor is calculated in the routine for calculating the target current value shown in FIG. 2, which is repeated at longer intervals (5milliseconds) while only the comparison of the limit value with the duty factor is conducted in the routine for controlling the current shown in FIG. 3, which is repeated at shorter intervals (64 microseconds). Therefore, in comparison with a case where the limit is controlled according to the output signal of the current sensor 3 only in the routine for controlling the current, the number of times of calculation in the CPU is reduced, so that the efficiency of the processing can be improved.

Furthermore, since the limit value of the duty factor is calculated in accordance with the target current value, it is unnecessary to provide another current detection means for detecting the battery current flowing from the secondary battery E during one pulsation of the pulse, whereby the structure of the device can be simplified.

Figure 4:
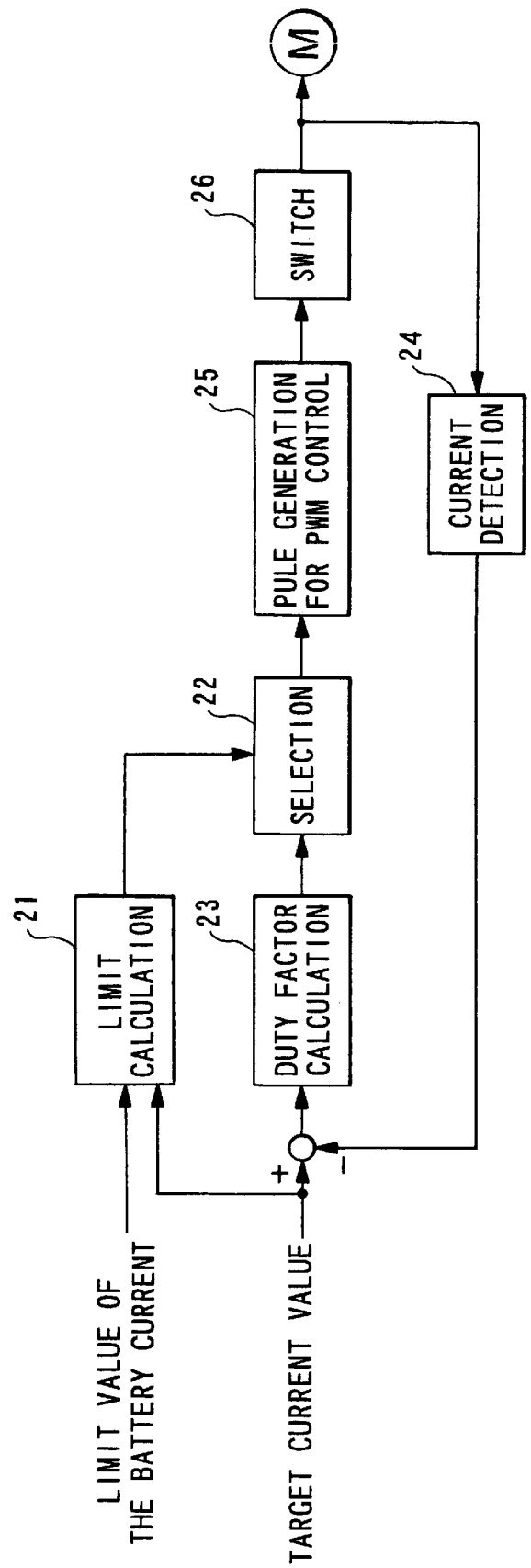
FIG. 4 is a functional block diagram showing a relationship between the embodiment and the attached claims.

The relationship between the above-described embodiment and main structural elements stated in the claims will be described with reference to FIG. 4. A limit calculating means 21, in the drawing, divides the limit of the battery current which can be discharged from the secondary battery E by the target current value, and outputs the calculation result as the limit value of the duty factor at Step Sa4. A selection means 22 compares the duty factor, which was calculated by a duty factor calculating means 23 on the basis of the detection results of a current detecting means 24 at Step Sb2, with the limit value of the duty factor calculated by the limit calculating means 21. If the calculated duty factor is less than the calculated limit value, the selection means 22 provides the duty factor, which was calculated by the duty factor calculating means 23, for a pulse generating means 25 (one function of the controller 2) for the PWM control. On the other hand, if the duty factor is greater than the limit value, the selection means 22 provides the limit value for the pulse generating means 25. Accordingly, the duty factor provided for the pulse generating means 25 is not in excess of the limit value, so that the switching means 26 (switching unit 1) allows a current from the secondary battery E to flow to the motor M in a manner that the current is less than the limit of the battery current.

Figure 5:
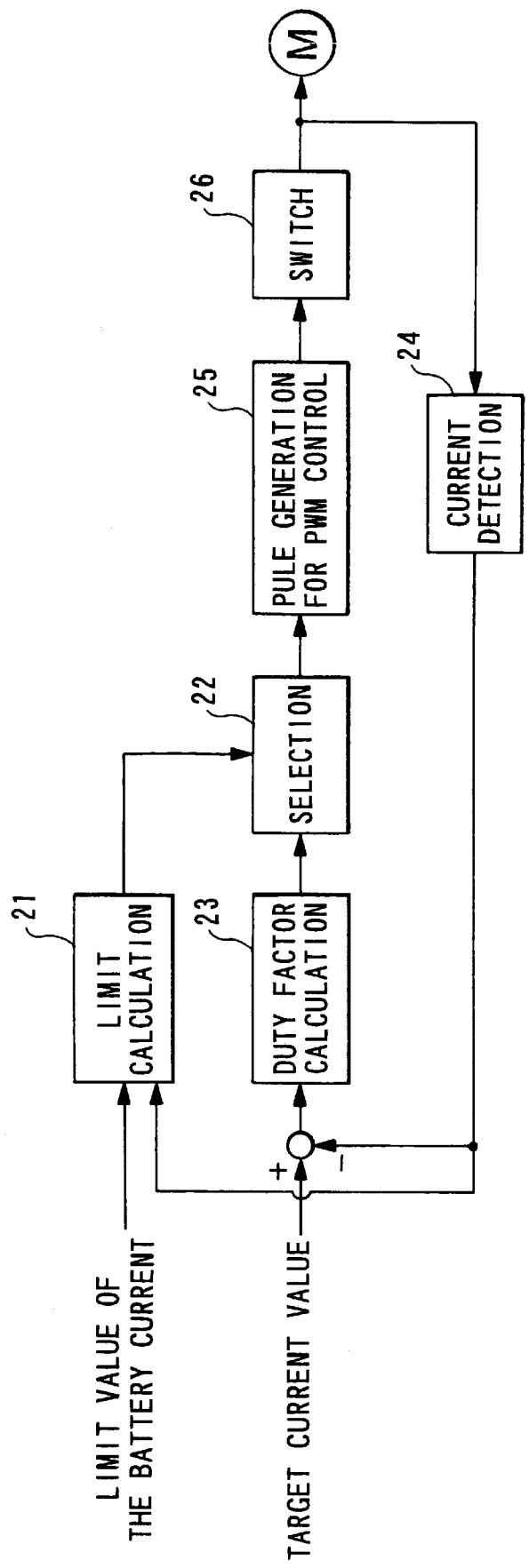
FIG. 5 is a functional block diagram showing a relationship between another embodiment and the attached claims.

Although the limit value of the duty factor is calculated on the basis of the target current value in the above-described embodiment, the present invention is not limited to the embodiment. Instead, the limit value may be obtained in such a manner that the limit value of the battery current is divided by the detection result of the actual current value detected at intervals of 5 milliseconds which is the same as the intervals of the routine for calculating the target value. In this case, the detection result of the current detecting means 24 is provided for the limit calculating means 21 shown in FIG. 4. The functional block diagram of this modification is represented in FIG. 5.

Although the present invention is applied to the bicycle with the auxiliary power source in the above-described embodiment, the present invention is not limited to this kind of bicycle, and can be applied to other devices and machines of which the power sources are secondary cells.

As described above, in accordance with the present invention, since the duty factor of the generated pulse for the PWM control is not in excess of the limit value, it is prevented that the overcurrent in excess of the battery current is discharged. Accordingly, it is prevented that the lifetime of the secondary cells from being shortened, and it is unnecessary to use secondary cells of which the capacitance is large for preventing the cells from discharging the overcurrent.

INDUSTRIAL APPLICABILITY

The present invention is preferable for preventing rechargeable cells (secondary cells), for example, enclosed lead acid cells or enclosed Ni—Cd cells, from discharging overcurrent, and is applicable to an overcurrent protection device.

What is claimed is:

1. A current controlling and overcurrent protection device for controlling a current flow from at least one secondary cell to a motor, said device including a switching means for allowing a current, corresponding to a duty factor of a pulse for a PWM control, to flow to the motor; current detecting means for detecting the current flowing to the motor and for outputting this detection result; duty factor calculating means for calculating a duty factor, corresponding to a current value instruction, for adjusting the current flowing to the motor, such that the detection result of the current detecting means is coincident with a target current value which should flow to the motor; and a pulse generating means for generating a pulse for said PWM control having the duty factor calculated by the duty factor calculating means and for providing the pulse for said switching means, the overcurrent protection being provided by limit calculating means for dividing a limit current value, which can be discharged from the secondary cell, by a dividing value comprised of one of said target current value and the detection result of the current detecting means and means for outputting the division result as a limit value of the said duty factor; and selection means for comparing the duty factor calculated by the duty factor calculating means with said limit value, said selection means providing the duty factor calculated by the duty factor calculating means for the pulse generating means if the duty factor is less than the limit value and providing said limit value for said pulse generating means if said duty factor is greater than said limit value.

2. An overcurrent protection device according to claim 1 wherein the dividing value comprises the detection result of the current detecting means.

3. An overcurrent protection device according to claim 2, wherein the duty factor calculating means calculates the duty factor at first intervals, and the limit calculating means calculates the limit value at second intervals, the second intervals being prescribed longer than the first intervals.

4. An overcurrent protection device according to claim 1 wherein the dividing value comprises the target current value.

5. An overcurrent protection device according to claim 4, wherein the duty factor calculating means calculates the duty factor at first intervals, and the limit calculating means calculates the limit value at second intervals, the second intervals being prescribed longer than the first intervals.

6. A method for current control and overcurrent protection device for controlling a current flow from at least one secondary cell to a motor, said method comprising switching a current flow corresponding to a duty factor of a pulse for a PWM control flowing to the motor, detecting the current flowing to the motor and for outputting this detection result, calculating a duty factor, corresponding to a current value instruction for adjusting the current flowing to the motor, so that the detection result of the current detection is coincident with a target current value which should flow to the motor, and generating a pulse for the PWM control having the duty factor calculated by the duty factor calculation and providing the pulse for the switching, performing a limit calculation by dividing a limit current value, which can be discharged from the secondary cell, by a dividing value comprised of one of the target current value and the detection result of the current detection, outputting the division result as a limit value of the duty factor, and comparing the duty factor calculated by the duty factor calculation with the limit value, and providing the duty factor calculated by the duty factor calculation for the pulse generation if the duty factor is less than the limit value and providing the limit value for the pulse generating if the duty factor is greater than the limit value.

7. The method according to claim 6 wherein the dividing value comprises the detection result of the current detection.

8. The method according to claim 7, wherein the duty factor calculation is made at first intervals, and the limit calculation is made at second intervals, the second intervals being longer than the first intervals.

9. The method according to claim 6 wherein the dividing value comprises the target current value.

10. The method according to claim 9, wherein the duty factor calculation is made at first intervals, and the limit calculation is made at second intervals, the second intervals being longer than the first intervals.

* * * * *